United States Patent
Morosawa

(10) Patent No.: US 7,679,044 B2
(45) Date of Patent: Mar. 16, 2010

(54) OPTICAL SENSOR HAVING CURRENT AMPLIFIER INCLUDING AT LEAST ONE THIN-FILM TRANSISTOR, AND DISPLAY APPARATUS PROVIDED WITH THE OPTICAL SENSOR

(75) Inventor: Katsuhiko Morosawa, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 12/189,301

(22) Filed: Aug. 11, 2008

(65) Prior Publication Data

US 2009/0058502 A1 Mar. 5, 2009

(30) Foreign Application Priority Data

Aug. 31, 2007 (JP) ............................. 2007-226142

(51) Int. Cl.
 *H01J 40/14* (2006.01)
(52) U.S. Cl. ................................ 250/214 R; 250/214.1
(58) Field of Classification Search .............. 250/214.1, 250/214 R, 208.1, 205, 214 LA, 370.09–370.14; 345/46, 76–102, 173, 175, 204–211
 See application file for complete search history.

(56) References Cited

U.S. PATENT DOCUMENTS 6,064,362 A * 5/2000 Brownlow et al. ............ 345/98

FOREIGN PATENT DOCUMENTS

| JP | 7-263741 A | 10/1995 |
|---|---|---|
| JP | 2000-112382 A | 4/2000 |
| JP | 2003-75252 A | 3/2003 |

OTHER PUBLICATIONS

Japanese Office Action dated Jun. 2, 2009 and English translation thereof issued in a counterpart Japanese Application No. 2007-226142.

* cited by examiner

*Primary Examiner*—Que T Le
(74) *Attorney, Agent, or Firm*—Frishauf, Holtz, Goodman & Chick, P.C.

(57) ABSTRACT

An optical sensor includes a photoelectric converter to receive external light and to output a photocurrent signal according to the illuminance of the external light. A current-to-voltage converter converts the photocurrent signal output from the photoelectric converter to a voltage signal. A voltage amplifier amplifies the voltage signal. A current amplifier outputs a current signal corresponding to the voltage signal amplified by the voltage amplifier. Each of the photoelectric converter, current-to-voltage converter, voltage amplifier and current amplifier includes at least one thin-film transistor.

22 Claims, 4 Drawing Sheets

OPTICAL SENSOR HAVING CURRENT AMPLIFIER INCLUDING AT LEAST ONE THIN-FILM TRANSISTOR, AND DISPLAY APPARATUS PROVIDED WITH THE OPTICAL SENSOR

CROSS-REFERENCE TO RELATED APPLICATIONS

This application is based upon and claims the benefit of priority from prior Japanese Patent Application No. 2007-226142, filed Aug. 31, 2007, the entire contents of which are incorporated herein by reference.

BACKGROUND OF THE INVENTION

1. Field of the Invention

The present invention relates to an optical sensor having a current amplifier, and a display apparatus provided with the optical sensor.

2. Description of the Related Art

A non-emissive display apparatus, such as a liquid crystal display apparatus, displays an image by lighting a display unit on which pixel matrixes are arranged. A display unit can be lit by two methods. One uses external light around a display apparatus, and the other uses a light source (backlight) provided at the rear of a display unit. Generally, the former is called a reflective type display apparatus, and the latter is called a transmissive type display apparatus.

It is known that the viewability in a transmissive type display apparatus varies with the brightness around a display apparatus. For example, the viewability is good when the surrounding of a display apparatus is dark, and vice versa.

Jpn. Pat. Appln. KOKAI Publication No. 2000-112382 discloses a method of improving the viewability in a display apparatus by detecting the illuminance of light (external light) around a display apparatus by an optical sensor, and controlling the illuminance of backlight according to the illuminance of detected external light.

As a method of providing a compact sensor having a large dynamic range as an optical sensor for detecting the illuminance of light, Jpn. Pat. Appln. KOKAI Publication No. 2003-75252 discloses a technique to amplify a photocurrent signal detected by a photodiode constituting an optical sensor, by using a bipolar transistor.

When an optical sensor is used to detect the brightness around the display apparatus disclosed in Jpn. Pat. Appln. KOKAI Publication No. 2000-112382, if an amorphous thin-film transistor (hereinafter, called an a-Si TFT) is used for the optical sensor, the optical sensor and display unit can be manufactured in the same process. Here, the optical sensor using an a-Si TFT is assumed to detect a current (called a leak current) flowing between a drain and a source of a TFT according to the illuminance of light, when a negative voltage (e.g., −5V to −10V) is applied to a gate electrode of the TFT.

Generally, a leak current of a TFT is very small, and it is desirable to take out the leak current from an optical sensor after amplifying, to use an a-Si TFT optical sensor for controlling the luminance of backlight disclosed in Jpn. Pat. Appln. KOKAI Publication No. 2000-112382. The technique disclosed in Jpn. Pat. Appln. KOKAI Publication No. 2003-75252 amplifies an output current from an optical sensor by using a bipolar transistor. Therefore, when the technique disclosed in Jpn. Pat. Appln. KOKAI Publication No. 2003-75252 is used, as a TFT and a bipolar transistor are manufactured in different processes, a display unit and an optical sensor cannot be manufactured in the same process, and the number of manufacturing steps is inevitably increased.

BRIEF SUMMARY OF THE INVENTION

It is an object of the invention to provide an optical sensor particularly suitable for controlling the luminance of backlight in a display apparatus, and a display apparatus provided with the optical sensor.

According to a first aspect of the invention, there is provided an optical sensor comprising: a photoelectric converter to receive external light, and to output a photocurrent signal according to the illuminance of the external light; a current-to-voltage converter to convert the photocurrent signal output from the photoelectric converter to a voltage signal; a voltage amplifier to amplify the voltage signal; and a current amplifier to output a current signal corresponding to the voltage signal amplified by the voltage amplifier, wherein each of the photoelectric converter, current-to-voltage converter, voltage amplifier and current amplifier includes at least one thin-film transistor.

According to a second aspect of the invention, there is provided a display apparatus comprising: a display unit having arrays of pixels, each having a thin-film transistor, which displays an image by controlling transmission of light input to the pixels; an illumination unit which emits an illumination light to illuminate the pixels; an optical sensor which comprises a photoelectric converter to receive external light and output a photocurrent signal according to the illuminance of the external light, a current-to-voltage converter to convert the photocurrent signal to a voltage signal, a voltage amplifier to amplify the voltage signal, and a current amplifier to output a current signal according to the voltage signal amplified by the voltage amplifier, wherein each of the photoelectric converter, current-to-voltage converter, voltage amplifier and current amplifier includes at least one thin-film transistor; and a control unit which controls the illuminance of the illumination light based on the current signal output from the optical sensor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, an explanation will be given on embodiments of the invention with reference to the accompanying drawings.

Figure 1:
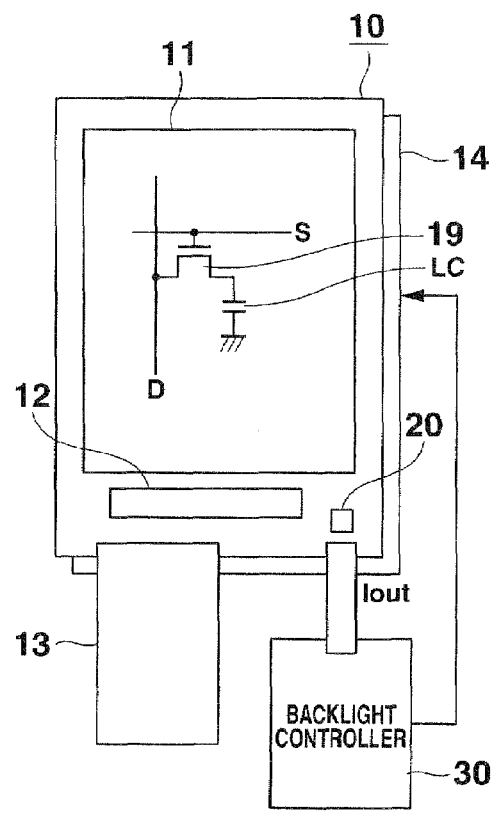
FIG. 1 is a diagram showing the whole configuration of a liquid crystal display apparatus as an example of a display apparatus provided with an optical sensor according to an embodiment of the invention.

FIG. 1 is a diagram showing the whole configuration of a liquid crystal display apparatus as an example of a display apparatus provided with an optical sensor according to an embodiment of the invention. The display apparatus shown in FIG. 1 has a display panel 10, an optical sensor 20, and a backlight controller 30. The display apparatus shown in FIG. 1 may not necessarily be a liquid crystal display apparatus, as long as it is a transmissive type display apparatus using backlight for displaying an image.

In the display panel 10, a flexible printed circuit board (FPC) 13 is connected to a glass substrate on which a display unit 11 and a driver 12 are mounted, and a backlight (an illumination unit) 14 is provided at the rear of the display unit 11. The display unit 11 includes scanning lines S, data lines D, a-Si thin-film transistors (TFT) 19 formed in proximity to each intersection of the scanning line S and data line D, and pixels consisting of a liquid crystal layer LC connected to the each TFT. Each pixel of the display unit 11 is applied a voltage from the driver 12, and changes the transmissivity of light. The display panel 10 offers gradation display by using this characteristic. The driver 12 applies a voltage to the display unit 11 based on the display data input through the FPC 13. The FPC 13 connects the display panel 10 to an external power supply or the like (not shown). The backlight 14 includes an LED (Light Emitting Diode) and a light guide plate to guide light from the LED to the display panel 11, and emits light from the rear of the display unit 11.

The optical sensor 20 is mounted on the glass substrate of the display panel 10, detects the brightness around the display unit 11 (the illuminance of external light applied to the display unit 11), and outputs a current signal Iout corresponding to the detected illuminance of external light to the backlight controller 30. The optical sensor 20 will be explained in detail later.

The backlight controller 30 takes in the current signal Iout from the optical sensor 20, and controls the illuminance of the backlight 14 according to the largeness of the taken-in current signal.

Figure 2:
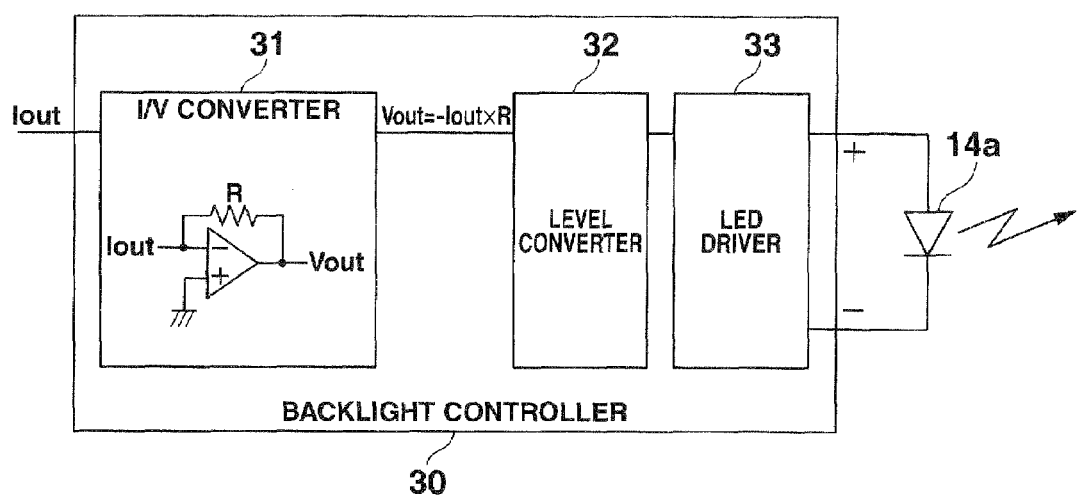
FIG. 2 is a block diagram showing the internal configuration of a backlight controller.

FIG. 2 is a block diagram showing the internal configuration of the backlight controller 30. As shown in FIG. 2, the backlight controller 30 has an I-V converter 31, a level converter 32, and an LED driver 33. The I-V converter 31 converts the current signal Iout from the optical sensor 20 to a voltage signal Vout (Vout=−Iout×R). The level converter 32 converts the level (adjusts the gain) of the voltage signal Vout obtained by the I-V converter 31. The LED driver 33 generates a voltage to drive the LED 14a of the backlight 14 according to the voltage signal obtained by the level converter 32, and supplies the voltage to the backlight 14. The LED driver 33 controls the LED 14a driving voltage so that is becomes proportional to the luminance of the external light detected by the optical sensor 20. The LED 14a driving voltage may be changed continuously or discretely. When the illuminance of the external light detected by the optical sensor 20 is high, the LED 14a driving voltage is increased so that the illuminance of the LED 14a is increased. This improves the viewability of the display unit 11. In contrast, when the illuminance of the external light detected by the optical sensor 20 is low, the LED 14a driving voltage is decreased so that the illuminance of the LED 14a is decreased. This saves the power consumption.

Figure 3:
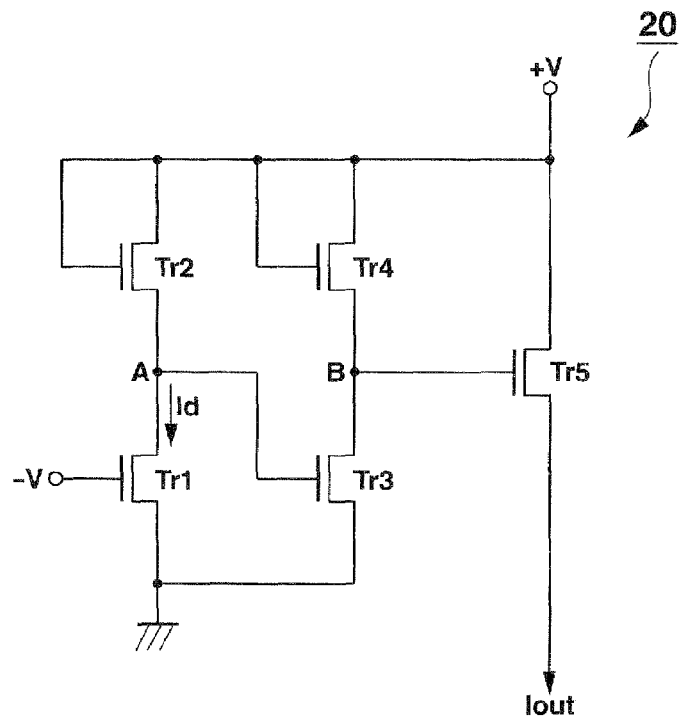
FIG. 3 is a diagram showing the circuit configuration of an optical sensor.

Hereinafter, the optical sensor 20 will be explained in detail. FIG. 3 is a diagram showing the circuit configuration of the optical sensor 20. The optical sensor 20 shown in FIG. 3 has a-Si thin-film transistors Tr 1, Tr 2, Tr 3, Tr 4, and Tr 5.

Figure 4:
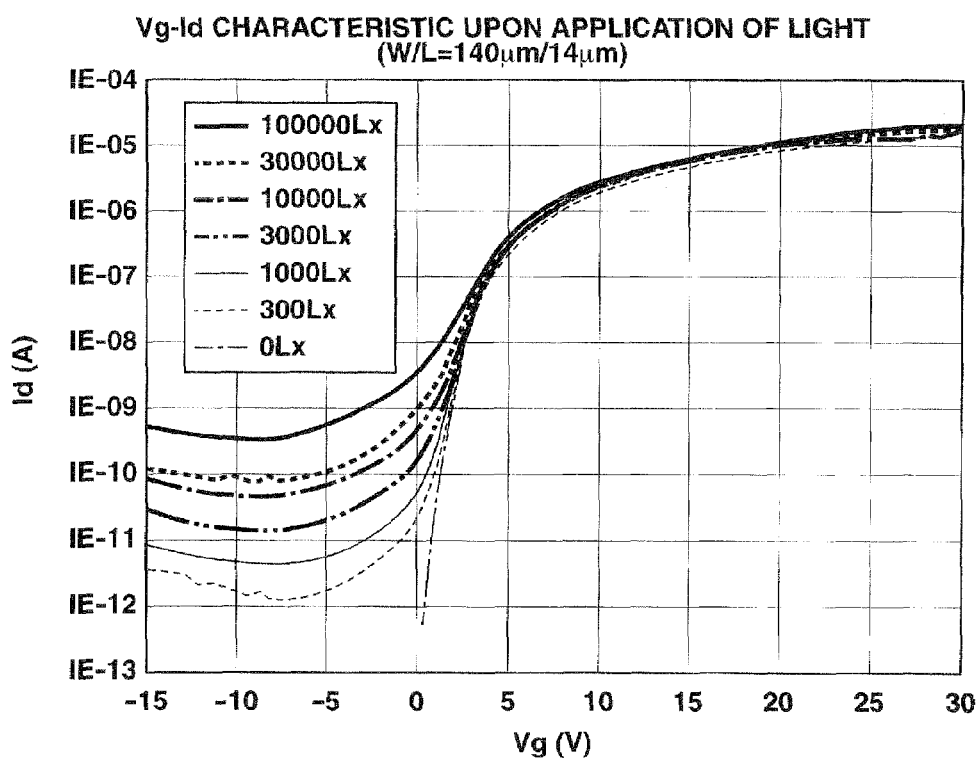
FIG. 4 is a graph showing the gate voltage Vg–drain current Id characteristic when light is applied to a TFT.

The transistor Tr 1 is a MOS transistor type optical sensor element. In the transistor Tr 1, a gate terminal as a control terminal is connected to a negative voltage source −V, and one of drain and source terminals as a current path is connected to a point A as a first connection point, and the other is grounded. The transistor Tr 1 functions as a photoelectric converter to detect the illuminance of light by using the gate voltage Vg–drain current Id characteristic when light is applied to a TFT, as shown in FIG. 4. As shown in FIG. 4, the TFT has the characteristic of flowing a photocurrent signal corresponding to the illuminance of input light, when light is emitted while a negative voltage (e.g., −5V to −10V) is being applied to the gate terminal. By detecting the photocurrent signal, the TFT can be used as an optical sensor.

As a drain current (a leak current) to flow in the TFT upon application of light is emitted is very small as shown in FIG. 4, it is difficult to use a drain current to control the illuminance of the backlight 14 as it is. In this embodiment, the current Id flowing in the transistor Tr 1 is amplified, and then supplied to the backlight controller 30. Hereinafter, an explanation will be given on an amplifier for this purpose.

In the transistor Tr 2, one of the drain and source terminals as a current path is connected to a positive voltage source +V together with the gate terminal as a control terminal, and the other is connected to the point A. The transistors Tr 1 and Tr 2 form an inverter circuit, and function as a current-to-voltage converter to generate an electric potential corresponding to a leak current at the point A when a leak current flows in the transistor Tr 1 when light is applied.

In the transistor Tr 3, the gate terminal as a control terminal is connected to the point A, and one of the drain and source terminals as a current path is connected to a point B as a second connection point, and the other is grounded. In the transistor Tr 4, one of the drain and source terminals as a current path is connected to a positive voltage source +V together with the gate terminal as a control terminal, and the other is connected to the point B. These transistors Tr 3 and Tr 4 form an inverter circuit, and function as a voltage amplifier to generate a potential obtained by inversely amplifying the potential generated at the point A at the point B.

In the transistor Tr 5, the gate terminal as a control terminal is connected to the point B, and one of the drain and source terminals as a current path is connected to a positive voltage source +V, and the other is connected to the backlight controller 30 as an output terminal. The transistor Tr 5 functions as a current amplifier to output an output current Tour corresponding to the potential at the point B.

Further, from a different viewpoint, the output current Iout of the transistor Tr 5 is increased when the current flowing in the transistor Tr 1 as an optical sensor element is increased, and the output current Iout of the transistor Tr 5 is decreased when the current flowing in the transistor Tr 1 as an optical sensor element is decreased. Therefore, it can be said that the transistors Tr 2 to Tr 5 function as a current amplifier.

In the configuration of FIG. 3, when light is applied to the transistor Tr 1, a drain current (a leak current) Id corresponding to the illuminance of the applied light flows. When the current flows in the transistor Tr 1, the potential at the point A changes accordingly. In the configuration of FIG. 3, the potential at the point A decreases when the current Id increases, and vice versa. When the potential at the point A changes, the potential at the point B also changes. In the configuration of FIG. 3, the potential at the point B increases when the potential at the point A decreases, and vice versa. When a potential is generated at the point B, the current Iout flowing in the transistor Tr 5 changes. In the configuration of FIG. 3, the output current Iout increases when the potential at the point B increases, and vice versa.

Namely, in the configuration of FIG. 3, when the illuminance of the light applied to the transistor Tr 1 increases (the current Id increases), the output current Iout increases, and vice versa. The output current of the transistor Tr 1 is amplified as above.

Figure 5:
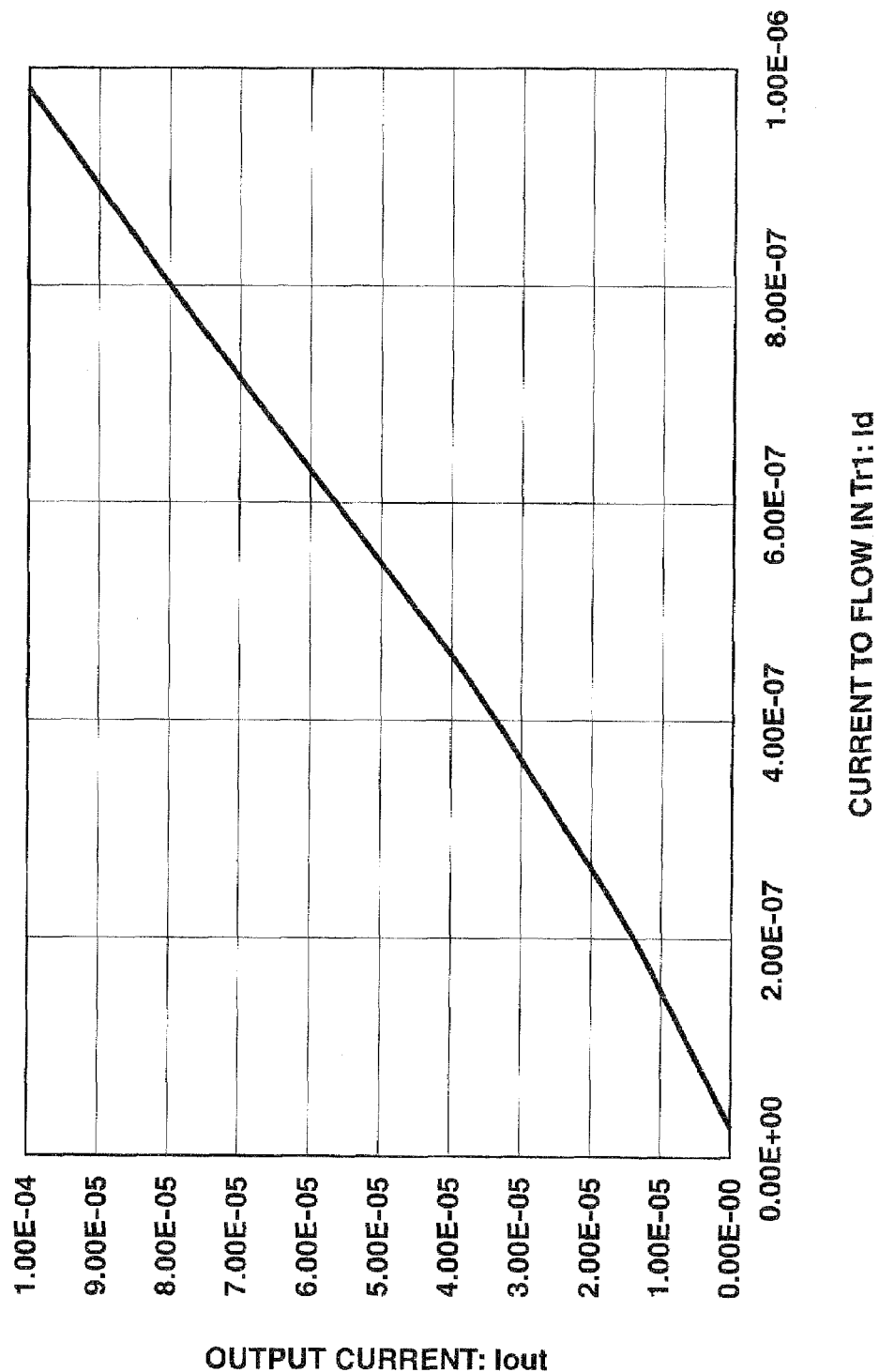
FIG. 5 is a graph showing the result of simulation for the circuit of FIG. 3.

Assuming the ratio of the current Iout flowing in the transistor Tr 5 to the current Id flowing in the transistor Tr 1 to be a current amplification factor of the whole circuit of FIG. 3, the current amplification factor can be changed by the channel width W or channel length L of each transistor. For example, in the configuration of FIG. 3, when the power supply voltage is set to ±12V, the each transistor channel length L is set to 6.2 µm, and the transistor Tr 1 uses a TFT having the channel width W of 100000 µm (=100 mm), the current amplification factor can be increased by about 100 times by assuming the channel widths of the transistors Tr 2, Tr 3, Tr 4 and Tr 5 to be 1600 µm, 7400 µm, 80 µm and 1000 µm, respectively. FIG. 5 shows the result of circuit simulation in this setting. In the circuit simulation, Iout of $10^{-5}$ order is obtained from Id of $10^{-7}$ order, and the current amplification factor is increased by about 100 times. The value of Id is larger than the example of FIG. 4, because the channel width W of the transistor Tr 1 is longer than the example of FIG. 4.

Further, when the same transistor Tr 1 as the above is used, the current amplification factor can be increased by about 1000 times by assuming the channel widths of the transistors Tr 2, Tr 3, Tr 4 and Tr 5 to be 12800 µm, 74000 µm, 80 µm and 8000 µm, respectively. Likewise, the current amplification factor can be increased by about 10 times by assuming the channel widths of the transistors Tr 2, Tr 3, Tr 4 and Tr 5 to be 160 µm, 740 µm, 80 µm and 100 µm, respectively.

Hereinafter, an explanation will be given on the configuration of a TFT constituting the optical sensor 20 or a pixel of the display unit 11 shown in FIG. 3. As described above, in this embodiment, an a-Si TFT is used as a transistor to constitute the optical sensor 20 and a pixel of the display unit 11, respectively. Therefore, these transistors can be manufactured in a common manufacturing process.

Figure 6:
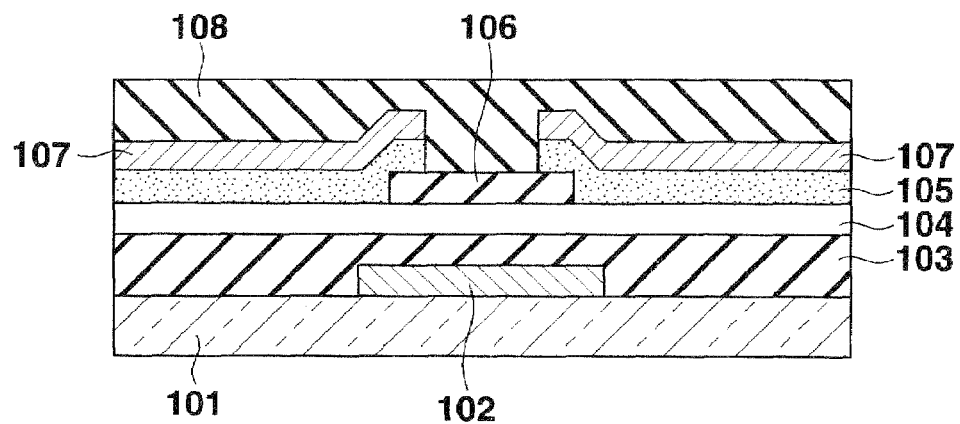
FIG. 6 is a view showing the cross section of a TFT.

FIG. 6 is a view showing the cross section of a TFT consisting of the optical sensor 20 or a pixel of the display unit 11. In the TFT shown in FIG. 6, a gate electrode 102 is formed on the glass substrate 101 of the display panel 10. The gate electrode 102 is formed by forming a metal film such as Cr, Al and Ti on the glass substrate by sputtering, and etching the metal film. In FIG. 6, a gate insulation film 103 made of $SiO_2$ or SiNx is formed on the glass substrate 101 provided with the gate electrode 102. The gate insulation film 103 is formed by a plasma CVD method, for example.

Further, in FIG. 6, an intrinsic a-Si layer 104 and $n^+$ a-Si layer 105 are formed on the gate insulation film 103. These intrinsic a-Si layer 104 and $n^+$ a-Si layer 105 are formed by a plasma CVD method, for example. An etching stopper 106 made of an insulating material such as SiNx is formed between the intrinsic a-Si layer 104 and $n^+$ a-Si layer 105.

Further, in FIG. 6, a source electrode and a drain electrode 107 are formed on the $n^+$ s-Si layer 105. The source electrode and drain electrode 107 are formed by forming a metal film such as Cr, Al and Ti on the $n^+$ s-Si layer 105 by sputtering, and etching the metal film. The etching stopper 106 protects a channel area of the intrinsic a-Si layer 104 when the $n^+$ a-Si layer 105 is separated on the channel area by etching.

Every TFT constituting the optical sensor 20 and a pixel of the display unit 11 have common cross section as described above. Namely, a TFT constituting the optical sensor 20 and a pixel of the display unit 11 have the same layer structure, though the plane shape and area are different. Here, the same layer structure means a structure in which the gate electrode, intrinsic a-Si layer, $n^+$ a-Si layer, and source and drain electrodes are made of the same material with substantially the same thickness, and laminated in the same order. The same layers lamination structure is defined as a structure having a layers structure laminated by the same materials and in the same order.

In FIG. 6, a protection film 108 is formed on the drain electrode and source electrode 107.

When light is applied to the intrinsic a-Si layer 104 shown in FIG. 6, a current is generated by photoelectric conversion. This is a leak current as described above. When a TFT is used as a pixel of the display unit 11, the intrinsic a-Si layer 104 is shielded by the protection film 108 not to generate a leak current. When a TFT is used as a photoelectric converter of the optical sensor 20, the intrinsic a-Si layer 104 is not shielded. A leak current generated by photoelectric conversion can be increased by increasing the channel length L or channel width W. However, if the channel length L or channel width W is increased, the size of the optical sensor 20 is inevitably increased.

Figure 7:
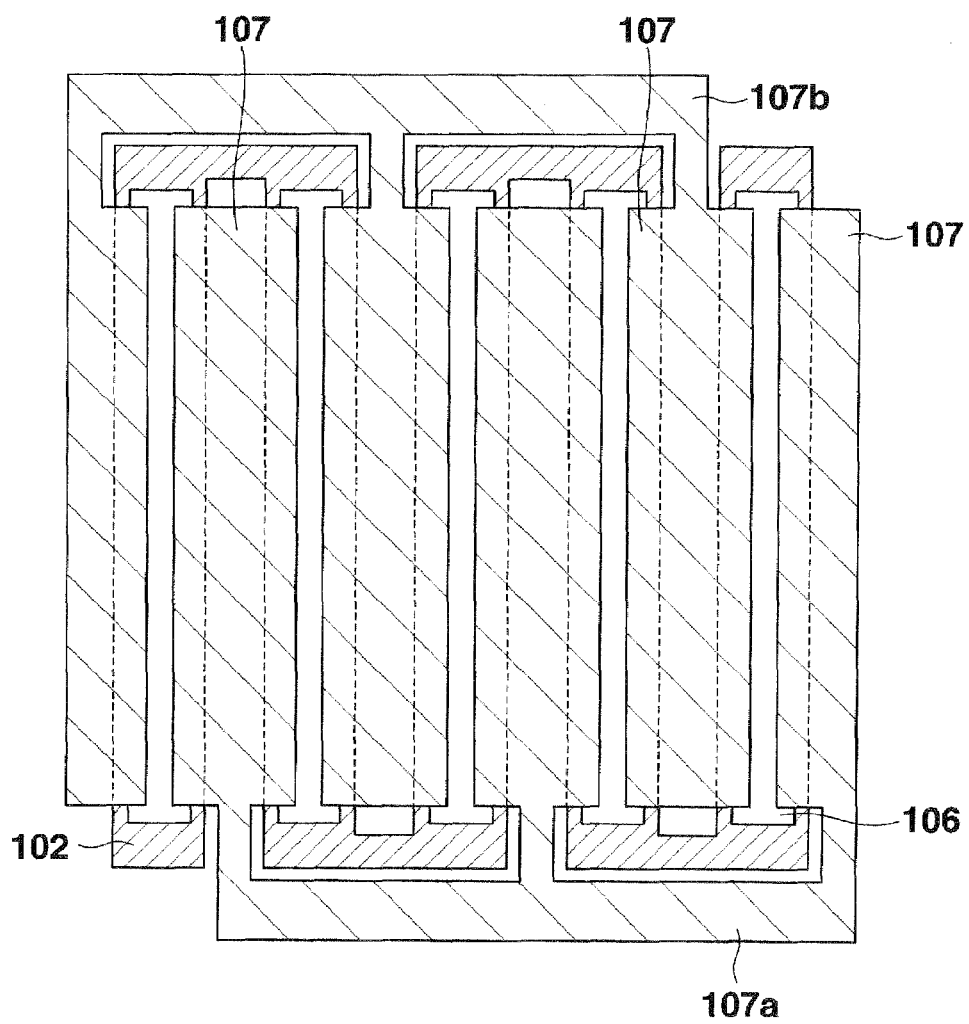
FIG. 7 is a view showing the bending structure of a TFT.

In this embodiment, upsizing of the optical sensor 20 is prevented by making a TFT bendable, and a large leak current can be obtained by increasing the channel width W. FIG. 7 shows the bendable structure of a TFT. As shown in FIG. 7, the gate electrode 102 is formed by bending one electrode zigzag at a predetermined length. As for the source electrode and drain electrode, parts along the right end side and left end side of the gate electrode 102 are formed, and a part across the isolated part of the gate electrode 102 bent zigzag is formed. The part across the isolated part of the gate electrode 102 bent zigzag is alternately connected to the right end sides of the source electrode and drain electrode 107 by a connection part 107a. This forms one of the source electrode and drain electrode. The portion not connected by the connection part 107a in the part across the isolated part of the gate electrode 102 bent zigzag is connected to the left end sides of the source electrode and drain electrode 107 by a connection part 107b. This forms the other one of the source electrode and drain electrode. In such a configuration, the channel width W can be increased according to the number of bending.

As explained herein, according to this embodiment, the photoelectric converter and amplifier of the optical sensor 20 are formed by the same a-Si TFT as the pixel of the display unit 11, and the optical sensor 20 and display unit 11 can be manufactured on a glass substrate in the same manufacturing process. This is particularly suitable for an optical sensor used to control the illuminance of backlight of a liquid crystal display.

Further, an optical current output from the a-Si TFT photoelectric converter can be amplified to a level usable for controlling the illuminance of backlight, and an optical current can be taken out by using a low-cost I-V converter. Further, as the output current from the optical sensor is large, an external noise is not so obtrusive.

By the bendable structure of TFT constituting the optical sensor 20, the channel length of TFT can be increased, and upsizing of the optical sensor 20 can be prevented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical sensor comprising:
   a photoelectric converter to receive external light, and to output a photocurrent signal according to the illuminance of the external light;
   a current-to-voltage converter to convert the photocurrent signal output from the photoelectric converter to a voltage signal;
   a voltage amplifier to amplify the voltage signal; and
   a current amplifier to output a current signal corresponding to the voltage signal amplified by the voltage amplifier,
   wherein each of the photoelectric converter, current-to-voltage converter, voltage amplifier and current amplifier includes at least one thin-film transistor.

2. The optical sensor according to claim 1, wherein the at least one thin-film transistor included in one of the photoelectric converter, current-to-voltage converter, voltage amplifier and current amplifier has the same layers lamination structure as that of the at least one thin-film transistor included in another one of the photoelectric converter, current-to-voltage converter, voltage amplifier and current amplifier.

3. The optical sensor according to claim 1, wherein the at least one thin-film transistor consists of an amorphous silicon thin-film transistor.

4. The optical sensor according to claim 1, wherein the photoelectric converter includes a first thin-film transistor having a control terminal connected to a negative power supply, a first current path connected to a first connection point, and a grounded current path.

5. The optical sensor according to claim 4, wherein the current-to-voltage converter includes a second thin-film transistor having a control terminal connected to a positive power supply, a second current path connected to the positive power supply, and a third current path connected to the first connection point.

6. The optical sensor according to claim 5, wherein the voltage amplifier includes an inverter circuit connected to the first connection point.

7. The optical sensor according to claim 6, wherein the voltage amplifier includes an inverter circuit connected to the current-to-voltage converter.

8. The optical sensor according to claim 6, wherein the voltage amplifier includes:
   a third thin-film transistor having a control terminal connected to the first connection point, a fourth current path connected to a second connection point, and a grounded current path; and
   a fourth thin-film transistor having a control terminal connected to the positive power supply, a fifth current path connected to the positive power supply, and a sixth current path connected to the second connection point.

9. The optical sensor according to claim 8, wherein the current amplifier includes a fifth thin-film transistor having a control terminal connected to the second connection point, a seventh current path connected to the positive power supply, and a eighth current path connected to an output terminal.

10. An optical sensor comprising:
    an optical sensor element to receive external light, and output a photocurrent signal according to the illuminance of the external light; and
    a current amplifier including thin-film transistors, to increase and decrease an output current in proportion to an increase and decrease in the photocurrent signal output from the optical sensor element,
    wherein the optical sensor element has the same layers lamination structure as each of the thin-film transistors included in the current amplifier.

11. The optical sensor according to claim 10, wherein the current amplifier includes:
    a current-to-voltage converter to convert the photocurrent signal output from the optical sensor element to a voltage signal;
    a voltage amplifier to amplify the voltage signal; and
    a current amplifier to output a current signal according to the amplified voltage signal.

12. An optical sensor comprising:
    an optical sensor element including a thin-film transistor, to output a photocurrent signal according to the illuminance of external light;
    a current-to-voltage converter including a thin-film transistor, to convert the photocurrent signal to a voltage signal;
    a voltage amplifier including an inverter circuit including two thin-film transistors connected in series, to amplify the voltage signal; and
    a current amplifier including at least one thin-film transistor, to output a current signal according to the voltage signal amplified by the voltage amplifier,
    wherein the thin-film transistors included in the optical sensor element, current-to-voltage converter, voltage amplifier, and current amplifier have the same layers lamination structures as each other.

13. A display apparatus comprising:
    a display unit having arrays of pixels, each having a thin-film transistor, which displays an image by controlling transmission of light input to the pixels;
    an illumination unit which emits an illumination light to illuminate the pixels;
    an optical sensor which comprises a photoelectric converter to receive external light and output a photocurrent signal according to the illuminance of the external light, a current-to-voltage converter to convert the photocurrent signal to a voltage signal, a voltage amplifier to amplify the voltage signal, and a current amplifier to output a current signal according to the voltage signal amplified by the voltage amplifier, wherein each of the photoelectric converter, current-to-voltage converter, voltage amplifier and current amplifier includes at least one thin-film transistor; and
    a control unit which controls the illuminance of the illumination light based on the current signal output from the optical sensor.

14. The display apparatus according to claim 13, wherein the photoelectric converter includes a first thin-film transistor having a control terminal connected to a negative power supply, a first current path connected to a first connection point, and a grounded current path.

15. The display apparatus according to claim 14, wherein the current-to-voltage converter includes a second thin-film transistor having a control terminal connected to a positive power supply, a second current path connected to the positive power supply, and a third current path connected to the first connection point.

16. The display apparatus according to claim 15, wherein the voltage amplifier includes an inverter circuit connected to the first connection point.

17. The display apparatus according to claim 16, wherein the voltage amplifier includes an inverter circuit connected to the current-to-voltage converter.

18. The display apparatus according to claim 16, wherein the voltage amplifier includes:
- a third thin-film transistor having a control terminal connected to the first connection point, a fourth current path connected to a second connection point, and a grounded current path; and
- a fourth thin-film transistor having a control terminal connected to the positive power supply, a fifth current path connected to the positive power supply, and a sixth current path connected to the second connection point.

19. The display apparatus according to claim 18, wherein the current amplifier includes a fifth thin-film transistor having a control terminal connected to the second connection point, a seventh current path connected to the positive power supply, and a eighth current path connected to an output terminal.

20. A display apparatus comprising:
- a display unit having arrays of pixels, each having a thin-film transistor, which displays an image by controlling transmission of light input to the pixels;
- an illumination unit which emits an illumination light to illuminate the pixels;
- an optical sensor which comprises an optical sensor element to receive external light, and output a photocurrent signal according to the illuminance of the external light, and a current amplifier including thin-film transistors, to increase and decrease an output current signal in proportion to an increase and decrease in the photocurrent signal output from the optical sensor element, wherein the optical sensor element and each of thin-film transistors included in the current amplifier have the same layers lamination structures as each other; and
- a control unit which controls the illuminance of the illumination light based on the current signal output from the optical sensor.

21. The display apparatus according to claim 20, wherein the current amplifier includes a current-to-voltage converter to convert the photocurrent signal output from the optical sensor element to a voltage signal, a voltage amplifier to amplify the voltage signal, and a current amplifier to output a current signal according to the voltage signal amplified by the voltage amplifier.

22. A display apparatus comprising:
- a display unit having arrays of pixels, each having a thin-film transistor, which displays an image by controlling transmission of light input to the pixels;
- an illumination unit which emits an illumination light to illuminate the pixels;
- an optical sensor which comprises an optical sensor element including a thin-film transistor, to receive external light and output a photocurrent signal according to the illuminance of the external light, a current-to-voltage converter including a thin-film transistor to convert the photocurrent signal to a voltage signal, a voltage amplifier including an inverter circuit including two thin-film transistors connected in series, to amplify the voltage signal, and a current amplifier including at least one thin-film transistor, to output a current signal according to the voltage signal amplified the voltage amplifier, wherein the thin-film transistors included in the optical sensor element, current-to-voltage converter, voltage amplifier, and current amplifier have the same layers lamination structures as each other; and
- a control unit which controls the illuminance of the illumination light based on the current signal output from the optical sensor.

* * * * *